April 8, 1958 P. M. MINDER 2,830,234
ARRANGEMENT FOR SWITCHING SHUNT CAPACITOR BANKS
Filed Aug. 1, 1956

INVENTOR.
Peter M. Minder
BY Ralph G. Hohenfeldt
Attorney

United States Patent Office 2,830,234
Patented Apr. 8, 1958

2,830,234

ARRANGEMENT FOR SWITCHING SHUNT CAPACITOR BANKS

Peter M. Minder, Basel, Switzerland, assignor to McGraw-Edison Company, a corporation of Delaware Application August 1, 1956, Serial No. 601,506

7 Claims. (Cl. 317—11)

This invention pertains to a scheme for switching shunt capacitors on and off an electric distribution system by means of a switch having a lower voltage rating than the system.

It is customary to connect and disconnect large banks of power factor corrective shunt capacitors from a power system in steps in accordance with the system's varying demand for leading reactive power. However, when a large capacitor bank is de-energized, the circuit interrupting contacts of the switching apparatus may be obligated to interrupt higher than normal circuit voltages due to well known inherent characteristics of highly capacitive circuits, among which is the potential addition of charge trapped on the capacitor to the steady state potential of the circuit being interrupted. This phenomena necessitates design of switching equipment capable of interrupting at two times crest voltage, which is the maximum voltage likely to occur, and whose contacts separate rapidly enough to prevent restriking of the arc incident to interruption. In the past, design requirements have been met by: switching steps or increments of capacity forming the banks with very expensive circuit breakers having current interrupting ratings and insulation values commensurate with those of the highest potentials expected to occur during switching, employing switches having given current and voltage nameplate ratings and down-rating them for use on capacitive circuits, modifying breakers to withstand restrikes, or, inserting resistors across the parted contacts for maintaining the circuit long enough to permit the contacts to separate far enough to build up sufficient dielectric strength.

It is an object of this invention to overcome the above noted electrical and economic disadvantages by a scheme for safely switching capacitors by means of a switch having a voltage rating actually under that of the system.

It is a further object to obviate use of a circuit breaker for switching any increment of a shunt capacitor bank.

Another object of this invention is to minimize the insulation levels of the switches in a capacitor switching arrangement. The net result of this object being greater convenience and economy without sacrifice of safety or efficiency.

It is a general object of this invention to provide a new and improved circuit arrangement for switching shunt capacitors associated with power distribution systems. More specific objects will appear periodically throughout ensuing portions of the specification.

The invention involves connecting and disconnecting steps of capacitance between phase wires in a single phase system or between a phase wire and a neutral point in a Y connected capacitor bank. It will appear hereinafter that varying circumstances determine whether the neutral is to be floating or grounded. The switch through which the capacitors are supplied from the line is preferably a three pole, air, oil or vacuum type, and for the purpose of the invention, three pairs of switch poles are connected in series and the switch effects a series of simultaneous breaks when opened. The switch may have less external bushings than poles, because the intermediate of the three poles may be connected in series internally, still keeping the three poles of the switch in series. An exemplary switch of the type alluded to, together with its electrical actuator, is illustrated in the copending application of O. Froland, filed November 14, 1955, Ser. No. 546,605, assigned to the instant assignee.

To benefit from the economic advantages of the invention it is preferable that the voltage rating of the switch bushings and the switch itself be lower than the voltage between a phase wire and neutral and between two phase wires. In other words, the switch is employed in a circuit of higher voltage than its own rating. According to the invention, this is accomplished by taking measures to assure that the circuit voltage divides proportionately across insulating components of the switch, notably across the switch insulating bushings, so that none of the components are in any event stressed beyond their safe working limits. Accordingly, in one form of the invention, the outgoing and incoming bushings of the switch are paralleled by auxiliary, relatively high impedance capacitors, resistors, or reactors which cause substantially equal voltage division between bushings. Conventional condenser bushings may be employed with like effect.

The invention contemplates operating the various switches by manual or electrical means properly insulated from possible potentials on the switch with respect to ground. In the illustrated embodiment this means that a dual winding insluating transformer of 1–1 ratio is interposed between the control station and switch; whereas, if manual operation is employed, an insulating member installed in the operating handle mechanism would achieve the same effect. The dual winding transformer facilitates use of independent control circuits for closing and tripping the capacitor switch from a remote position and minimizes insulation problems.

The novel shunt capacitor switching circuit is described in detail in connection with the following drawing in which.

Figures 1, 2, 3:
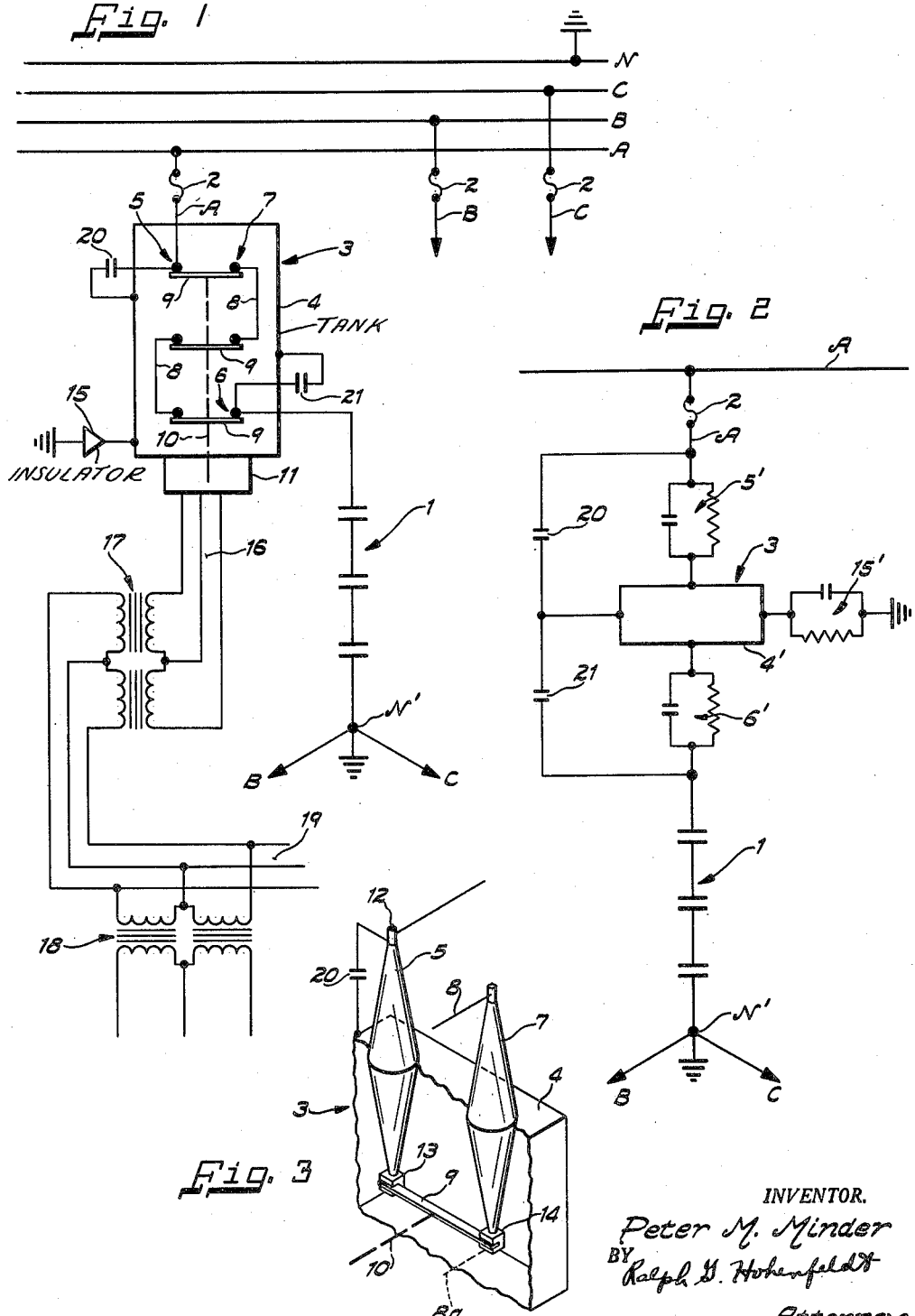
Fig. 1 illustrates a circuit for switching one of a plurality of capacitor steps in a single phase circuit or one phase of a polyphase capacitor bank.
Fig. 2 represents an equivalent diagram of the novel capacitor switching circuit.
Fig. 3 is a fragmentary schematic representation of one pole of a multi-pole switch which may be used in practicing the invention.

In reference to the drawing, in connection with which a preferred embodiment of the invention will be described, Fig. 1 shows a plurality of line wires A, B, C, and N comprising a typical polyphase system whose power, voltage or current it is desired to control by means of controlling power factor through selectively switching a group of shunt capacitors 1 between a line wire such as A and a neutral point such as N'. It is understood that the capacitor group is made up of a number of conventional individual capacitors contained within metal tanks carrying insulating bushings and that they may be series-parallel connected for any applied voltage. The metal tanks are insulated from ground.

The capacitors 1 are supplied from a line wire through a protective power fuse 2 and a three pole switch generally designated 3. Switch 3 may include a single metallic tank 4 as illustrated, or the individual poles may be housed separately in metallic or insulating housings. The switch is connected through an incoming bushing 5 and the capacitors 1 are connected to the switch on an outgoing bushing 6. The switch 3 may also be connected between capacitors 1 and a neutral point in the Y bank.

There are also shown a plurality of intermediate bushings 7 exterior to the switch tank and alternately connected together by a pair of external jumpers 8. Considerable economy may be effected by connecting the switch poles in series internally of the tank by interior jumpers such as 8a, see Fig. 3, thereby eliminating intermediate bushings 7. Interiorly of the tank, the circuit is completed by schematically represented bridging members 9 carried on a common insulating shaft 10 for simultaneous movement by an electric motor driven actuator 11 such as in the cited Froland patent application. Examining Fig. 3, it is evident that bridging members 9 are adapted to connect all poles of switch 3 in series by engagement with interrupting contacts such as 13, 14, which are in turn connected in series by jumpers 8.

The switch tank 4 is electrically isolated by supporting it on insulators symbolized by one insulator designated 15.

Operation of the switch is effected through actuator 11 supplied by three low voltage, such as 120 volt, control wires 16 receiving appropriate signals from a controller, not shown. In order to raise the insulation level of the control circuit to a level consistent with that of tank supporting insulator 15, a dual winding insulating transformer 17 is installed in the control wires 16. Transformer 17 preferably has a turns ratio of 1-1 so it does not affect the control circuit voltage, but it raises the insulation level of the control circuit. If desired, transformer 17 may have any other turns ratio. Where circumstances require greater insulation in the control circuit, several transformers 17 may be cascaded or a higher voltage transformer may be used.

Since there is one switch 3 for each step of capacitors 1 in each phase, the switch actuators 11 in the various phases receive a simultaneous control signal through a master insulating transformer 18 supplying control wire mains 19. It is evident that each transformer 17 is cascaded with master insulating transformer 18 so that the latter adds to the insulation level of each transformer 17.

It will be noted that incoming bushing 5 and outgoing bushing 6 are shunted by auxiliary voltage equalizing capacitors 20 and 21, respectively. Relatively high impedance resistors or reactors could also be used in place of 20 and 21. Their purpose is to assure equal division of potential between bushings 5 and 6 when the switch 3 is opened, since almost all the potential will then appear across the high impedance of the open switch because the impedance of the shunt capacitors 1 is then negligible by comparison. Capacitors 20 and 21 are connected between tank 4 and the wire terminals 12 of their associated bushings 5 and 6, see Fig. 3. By comparison with the various stray capacitances of the bushing and switch 3 parts the impedance of equalizing capacitors 20 and 21 is low, but in comparison with power factor corrective capacitors 1, their impedance is very high. When switch 3 is closed, the potential drop across equalizing capacitors 20, 21 is substantially zero. When switch 3 is opened, however, substantially the phase to neutral voltage is compelled to divide equally across the equalizing capacitors 20, 21. Accordingly, the bushings may have an insulating level equal to approximately one-half that of the phase to neutral voltage.

The reason for this phenomena is more understandable in reference to Fig. 2 which shows an equivalent circuit of the switching scheme and where it is assumed that switch 3 is open. Here the incoming bushing is represented by an equivalent capacitor in parallel with a resistance designated unitarily as 5'. Likewise the outgoing bushing equivalent and the tank supporting bushing equivalents are designated 6' and 15', respectively. The stray impedances of tank 4', equivalents 6' and 15' are actually in parallel with each other between tank to ground and in series with equivalent 5'. The equivalent impedance 5' is high in comparison with the paralleled impedances just referred to, so most of the potential appears across 5' without giving consideration to equalizing capacitors 20, 21. The equalizing capacitors, however, being of low impedance in comparison with the stray impedances, reduce the effect of the latter to insignificance so that voltage divides substantially equally across equalizing capacitors 20, 21.

As a practical example let it now be assumed that power factor correction is desired in connection with a power line having phase to phase voltage of 34.5 kv. and phase to neutral voltage of 19.9 kv. A three pole switch having a working insulation level of 15 kv. or less than the phase to phase or phase to neutral voltages is available to do the switching and it is apparent that in series, the incoming and outgoing bushings of the switch can withstand 30 kv. if the applied voltage is compelled to divide equally between them. If the system and capacitor bank neutrals are grounded, the switch will never be called upon to interrupt at voltages higher than 19.9 kv. because the neutral does not generally shift under this condition and a switch of the type suggested hereinbefore can easily handle such voltages since its individual poles are rated for 15 kv. and there are three such poles in series.

The insulator 15, supporting switch 3 above the potential to ground, may be rated at any value above 19.9 kv., because even with a solid phase to ground fault the voltage cannot exceed normal phase to neutral voltage when the neutral is fixed at the neutral point of the generator by grounding. Therefore, when the switch is open, even if none of the potential appears across equalizing capacitor 20, the tank 4 is safely insulated from ground by selecting insulator 15 at any value over 19.9 kv.

By cascading insulating transformers 17 and 18 the control circuit input represented by the primary of transformer 18 will be safely insulated from ground if the sum of the insulation levels of the two transformers exceeds 19.9 kv. Capacitors 1 should also be mounted on a supporting frame, not shown, insulated for full line to neutral potential of 19.9 kv.

As a further example, if the power line to which the corrective capacitors are applied and the corrective capacitors themselves have an ungrounded or floating neutral, then a reduction of the comparative phase to phase voltage is necessary if a 15 kv. switch is to be used because a shift of the neutral point may cause full phase to neutral voltage to appear on the switches. A common next lower phase to phase voltage would be nominally 26 kv. where the phase to neutral voltage of the capacitor bank would be 26÷1.732 or 15 kv.

Since switches 3 control a step of capacitors 1 in each phase simultaneously it is possible that there will be a slight difference in their clearing time. Accordingly, the first of the switches 3 to open will be stressed with respect to ground by a potential of 1.5 times phase to neutral of the capacitor bank voltage amounting to 1.5×15=22.5 kv.; and across its contacts by 2.5×15= 37.5 kv., the latter maximum potential being due to entrapped charge as explained earlier, and the former to the neutral shift due to unbalance in a Y system made up almost exclusively by capacitance. Hence, switch supporting bushing 15 must be capable of withstanding the expected phase to neutral potential when its value is subtracted from the insulation level of the neutral above ground potential. In this example, the total voltage of 37.5 kv. across the series of interrupting contacts is well within safe limits, since the total withstand voltage of three 15 kv. contacts in series is 45 kv.

The invention has been described in connection with a Y connected power system, but it is to be appreciated that the disclosure is equally applicable to delta systems, because such systems may be replaced by an equivalent Y system by simple mathematical manipulation as is well known to those versed in the electrical arts. Accordingly, it is apparent that the invention may be variously embodied and is, therefore, to be limited only by the terms of the claims which follow.

It is claimed:

1. In an electric power distribution system, the combination of a power capacitor selectively connectable to said system, a multi-pole switch including a metal housing, at least two insulating bushings on said switch each of which has one corresponding terminal connected to said system and said capacitor, respectively, and each of which has another corresponding terminal interiorly of said housing, and an equalizing impedance connected between each of said one terminals and said metal housing for establishing a definite potential mid-point, whereby potential distribution across said bushings will divide substantially evenly across said impedances and said bushings when said switch is open.

2. In combination with an electric power system, a relatively low impedance power capacitor selectively connectable thereto, a multi-pole switch including a metal housing insulated from ground, at least two insulating bushings mounted on said housing and extending interiorly and exteriorly thereof, each bushing having at a remotely opposite end a terminal exterior and interior of the metal housing, switch actuating means mounted on said metal housing, control means operably connected with said actuating means for operating said actuating means from a position remote from the switch, insulating means interposed in said control means between said actuating means and ground for raising the insulation level of said actuating means with respect to ground to that of said switch housing insulation with respect to ground, and an equalizing impedance connected between each of said external bushing terminals and said metal housing for establishing the housing at a definite potential, said equalizing impedances having high impedance compared with said power capacitor and low impedance compared with the stray impedance of said bushings, whereby potential distribution across said bushings will divide substantially proportionally to the value of the equalizing impedance when said switch is open.

3. In combination with an electric power system, a power capacitor connectable thereto for supplying reactive power to said system, a multi-pole switch for connecting and disconnecting said power capacitor, said switch including a metal housing having at least two bushings mounted thereon which extend interiorly and exteriorly of the housing, each of said bushings having a terminal exteriorly of the housing for connection with said system and said capacitor, respectively, said switch also having a plurality of contacts interiorly of the housing and bridging means for connecting said contacts in series between said terminals, first insulating means supporting said housing at a potential above ground, actuating means connected with said bridging means to move the latter for opening and closing said switch, said actuating means being associated with and exposed to potential appearing on the switch housing, control means operably connected with said actuating means for operating said actuating means from a position remote from the switch, second insulating means interposed in said control means between said actuating means and ground for raising the insulation level of said actuating means with respect to ground to that of said first insulating means with respect to ground, and an equalizing capacitor in parallel relation with each bushing and connected to their respective exterior terminals and said housing for establishing the metal housing at a definite potential mid-point with respect to the potential across both bushings, said equalizing capacitor having high impedance compared with said power capacitor and low impedance compared to the stray impedance of said bushings and said first insulating means, whereby applied potential of said system will divide across said bushings substantially proportionally to the capacity of said equalizing capacitors when said switch is open.

4. The invention according to claim 3 wherein said switch actuator is electrically operated and said control means comprises a control circuit supplying said actuator, and wherein said second insulating means comprises a dual winding insulating transformer interposed in the control circuit for insulating said control circuit for potentials at least equal to the potential of said switch housing above ground.

5. In combination with a polyphase electric power system, a bank of power capacitors connected thereto for supplying reactive power to the system, a multi-pole switch disposed in each phase of said bank in series with said power capacitors, each switch including a metal housing having at least two insulating bushings mounted thereon, each of said bushings having an exterior terminal connected respectively to said power system and said capacitors, said switches each having a plurality of circuit interrupting contacts and a bridging member for connecting them in series with said bushing terminals, first insulating means supporting said metal housing above ground potential, actuating means operably connected to move said bridging member for controlling said switch, control means operably connected with said actuating means for operating said actuating means from a position remote from the switch, second insulating means interposed in said control means between said actuating means and ground for raising the insulation level of said actuating means with respect to ground to that of said first insulating means with respect to ground, and an equalizing capacitor connected in parallel with each bushing between their aforesaid respective exterior terminals and said metal housing for establishing the metal housing at a definite potential mid-point with respect to the potential across both bushings, said equalizing impedances having high impedance compared with said power capacitors and low impedance compared with the stray impedance of said bushings, whereby applied potential of said system will divide across said bushings substantially proportionally to the capacity of said equalizing capacitors when said switch is open.

6. In combination with a Y connected polyphase power system having a grounded neutral, a blank of Y connected power capacitors connectable thereto for supplying reactive power to the system, the neutral point of said capacitor bank being grounded, a multi-pole switch disposed in each phase of said bank in series with said power capacitors, each switch including a metal housing having at least two bushings thereon of dielectric strength equivalent to less than half of the phase-to-phase potential of the system, each of said bushings having a terminal at an end exterior to the switch housing for respectively connecting the switch with the capacitors in each phase and with the power system, each switch having a plurality of circuit interrupting contacts and a bridging member for connecting them in series between said terminals, first insulating means having potential withstand strength equal to the phase-to-neutral voltage of the system and supporting said housing, actuating means for said bridging member, said actuating means being associated with and exposed to potential appearing on the switch housing, control means operably connected with said actuating means for operating said actuating means from a position remote from the switch, second insulating means interposed in said control means between said actuating means and ground, and equalizing capacitors connected in parallel with each of said bushings between the aforesaid respective exterior bushing terminals and said metal housing for establishing the metal housing at a definite potential mid-point with respect to the potential across both bushings, said equalizing impedances having high impedance compared with said power capacitors and low impedance compared with the stray impedance of said bushings and said first insulating means, whereby the phase-to-neutral potential of the system will divide substantially equally across the bushings when said switch is open.

7. In combination with a polyphase power system, a bank of power capacitors connectable thereto for supplying reactive power to the system, a neutral point of said capacitor bank being insulated from ground, a multi-pole switch disposed in each phase of said bank in series with said capacitors, each switch including a metal housing having at least two bushings thereon of total dielectric strength less than the voltage between phases of the system, each of said bushings having terminals exterior to the switch housing for connecting the switch with the capacitors in each phase and with said power system, respectively, each switch having a plurality of circuit interrupting contacts and a bridging member for connecting them in series with the terminals, first switch housing support insulating means having a potential withstand strength which when added to that of a switch bushing equals at least one and one-half times the phase-to-neutral voltage of the bank, actuating means associated with said switch housing for operating the aforesaid bridging member, a control circuit leading from said actuating means, second insulating means interposed between said actuating means and ground, equalizing capacitors connected in parallel with each of said bushings between respective exterior terminals and the metal housing for establishing the metal housing at a definite potential midpoint with respect to the potential across both bushings, said equalizing capacitors having high impedance compared with said power capacitors and low impedance compared to the stray impedance of said bushings and said first insulating means, and a transformer whose insulation value exceeds that of said housing support insulating means connected in said control circuit, whereby the potential applied to the switch will divide substantially equally across the switch bushings when the switch is open.

References Cited in the file of this patent

UNITED STATES PATENTS

| | | |
|---|---|---|
| 2,291,263 | Thornmen | July 28, 1942 |
| 2,292,252 | Thornmen | Aug. 4, 1942 |
| 2,675,505 | Flurscheim et al. | Apr. 13, 1954 |